United States Patent
Beavin et al.

(10) Patent No.: US 9,519,662 B2
(45) Date of Patent: *Dec. 13, 2016

(54) BOOLEAN TERM CONVERSION FOR NULL-TOLERANT DISJUNCTIVE PREDICATES

(71) Applicant: International Business Machines Corporation, Armonk, NY (US)

(72) Inventors: Thomas A. Beavin, Milpitas, CA (US); Mengchu Cai, San Jose, CA (US); Dengfeng Gao, San Jose, CA (US); Jae H. Lee, San Jose, CA (US); Li-Mey P. Lee, Cupertino, CA (US); Terence P. Purcell, Springfield, CA (US); Shengxi Suo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 14/022,322

(22) Filed: Sep. 10, 2013

(65) Prior Publication Data

US 2015/0074134 A1    Mar. 12, 2015

(51) Int. Cl.
G06F 17/30    (2006.01)

(52) U.S. Cl.
CPC ... *G06F 17/30289* (2013.01); *G06F 17/30448* (2013.01)

(58) Field of Classification Search
CPC .................. G06F 17/30427; G06F 17/30289; G06F 17/30448; G06F 17/30017; G06F 17/3002; G06F 17/30035
USPC ....................................................... 707/759
See application file for complete search history.

(56) References Cited

U.S. PATENT DOCUMENTS

| | | | | |
|---|---|---|---|---|
| 5,511,186 | A | * | 4/1996 | Carhart ............. G06F 17/30566 |
| 5,557,791 | A | * | 9/1996 | Cheng et al. |
| 5,590,324 | A | * | 12/1996 | Leung ............... G06F 17/30463 |
| 5,701,454 | A | * | 12/1997 | Bhargava et al. |
| 5,778,354 | A | * | 7/1998 | Leslie et al. .................. 707/715 |
| 5,884,304 | A | * | 3/1999 | Davis et al. |
| 5,905,982 | A | * | 5/1999 | Carey et al. .................. 707/694 |
| 5,963,933 | A | * | 10/1999 | Cheng ............... G06F 17/30454 |
| 6,032,143 | A | * | 2/2000 | Leung ............... G06F 17/30451 |

(Continued)

OTHER PUBLICATIONS

Bamford, Roger, et al., "XQuery Reloaded", VLDB '09, Lyon, France, Aug. 24-28, 2009, pp. 1342-1353.*

(Continued)

*Primary Examiner* — Robert Stevens
(74) *Attorney, Agent, or Firm* — Patterson + Sheridan, LLP (57) ABSTRACT

System, method, and computer program product to modify a received query, the received query including a first predicate specifying a comparison operator and a second predicate specifying an IS NULL operator, by replacing the comparison operator of the first predicate with an extended comparison operator, and removing the IS NULL operator from the received query, the extended comparison operator configured to support searching of NULL values in a database management system (DBMS), wherein the extended comparison operator is configured to return rows having column data matching a value predefined to represent NULL values.

15 Claims, 3 Drawing Sheets

(56) References Cited

U.S. PATENT DOCUMENTS

| | | | |
|---|---|---|---|
| 6,366,934 B1* | 4/2002 | Cheng | G06F 17/30595 707/999.2 |
| 6,529,896 B1* | 3/2003 | Leung et al. | |
| 6,665,664 B2 | 12/2003 | Paulley et al. | |
| 6,728,952 B1* | 4/2004 | Carey et al. | 717/141 |
| 6,965,894 B2 | 11/2005 | Leung et al. | |
| 6,983,275 B2* | 1/2006 | Koo | G06F 17/30454 |
| 6,996,557 B1* | 2/2006 | Leung et al. | |
| 7,461,060 B2* | 12/2008 | Beavin | G06F 17/30454 |
| 7,542,962 B2* | 6/2009 | Finlay et al. | |
| 7,676,450 B2* | 3/2010 | Ahmed et al. | 707/999.002 |
| 7,739,219 B2* | 6/2010 | Liu et al. | 707/713 |
| 7,970,756 B2* | 6/2011 | Beavin | G06F 17/30492 707/718 |
| 2006/0282424 A1* | 12/2006 | Larson et al. | 707/4 |
| 2007/0130115 A1* | 6/2007 | Au | G06F 17/30451 |
| 2011/0055197 A1* | 3/2011 | Chavan | 707/713 |
| 2011/0078134 A1* | 3/2011 | Bendel et al. | 707/713 |
| 2011/0082856 A1 | 4/2011 | Subbiah et al. | |
| 2013/0124500 A1* | 5/2013 | Beavin et al. | 707/714 |
| 2014/0067789 A1* | 3/2014 | Ahmed et al. | 707/714 |
| 2014/0379690 A1* | 12/2014 | Ahmed et al. | 707/713 |

OTHER PUBLICATIONS

Muralikrishna, M., "Improved Unnesting Algorithms for Join Aggregate SQL Queries", Proc. of the 18th VLDB Conf., Vancouver, BC, Canada, © 1992, pp. 91-102.*

Krishnaprasad, Muralidhar, et al., "Query Rewrite for XML in Oracle XML DB", Proc. of the 30th VLDB Conf., Toronto, ON, Canada, © 2004, pp. 1134-1145.*

Zhou, Chixiang, et al., "Mutation Testing for Java Database Applications", ICST 2009, Denver, CO, Apr. 1-4, 2009, pp. 396-405.*

Gessert, G. H., "Four Valued Logic for Relational Database Systems", SIGMOD Record, vol. 19, No. 1, Mar. 1990, pp. 29-35.*

Tuya, Javier, et al., "Mutating Database Queries", Information and Software Technology, vol. 49, Issue 4, Apr. 2007, pp. 398-417.*

Elhemali, Mostafa, et al., "Execution Strategies for SQL Subqueries", SIGMOD '07, Beijing, China, Jun. 12-14, 2007, pp. 993-1004.*

Klein, H. J., "How to Modify SQL Queries in Order to Guarantee Sure Answers", SIGMOD Record, vol. 23, No. 3, Sep. 1994, pp. 14-20.*

Veanes, Margus, et al., "Qex: Symbolic SQL Query Explorer", LPAR-16, LNAI 6355, Springer-Verlag, Berlin, Germany, © 2010, pp. 425-446.*

Paulley, G. N., et al., "Exploiting Uniqueness in Query Optimization", CASCON '93, Toronto, Canada, Oct. 1993, Proceedings—vol. 2, pp. 804-822.*

Malkemus, T., et al., "Predicate derivation and Monotonicity detection in DB2 UDB", ICDE 2005, Tokyo, Japan, Apr. 5-8, 2005, pp. 939-947.*

Brantner, Matthias, Rewriting Declarative Query Languages, School of Electronics and Computer Science, Oct. 11, 2007, University of Mannheim, Mannheim, Germany, 70 pages.

Brantner, Matthias, Rewriting Declarative Query Languages, School of Electronics and Computer Science, Oct. 11, 2007, University of Mannheim, Mannheim, Germany, 74 pages.

Brantner, Matthias, Rewriting Declarative Query Languages, School of Electronics and Computer Science, Oct. 11, 2007, University of Mannheim, Mannheim, Germany, 46 pages.

Claussen, Jens et al., Optimization and Evaluation of Disjunctive Queries, IEEE Transactions on Knowledge and Data Engineering, Mar. 2000, vol. 12, Issue 2, IEEE, Piscataway, United States, 23 pages.

Waraporn, Narongrit, Null Semantics for Subqueries and Atomic Predicates, International Journal of Computer Science, Jan. 2008, IAENG, Hong Kong, The Peoples Republic of China, 9 pages.

\* cited by examiner

BOOLEAN TERM CONVERSION FOR NULL-TOLERANT DISJUNCTIVE PREDICATES

BACKGROUND

The present disclosure relates to computer software, and more specifically, to computer software to provide Boolean term conversion for NULL-tolerant disjunctive predicates in a database management system.

In relational databases and programming languages, NULL is a special value that signifies "unknown." The result of comparing NULL with any value, including another NULL value, is unknown. The SQL standard defines an IS NULL predicate to qualify NULL values in relational databases.

Applications often need to search for both known values and NULL values, which requires the disjunction of an IS NULL predicate and another predicate for the known values. Disjunctive predicates are generally not eligible for single matching index access, and for matching index access require a multi-index access plan, due to the OR condition for the disjunctive predicates. For example, a query with two disjunctive predicates having two sets of OR conditions, when written in disjunctive normal form, may result in four predicates when each OR branch is distributed to each other OR branch. The complexity increases with more OR branches, which may reduce query efficiency because each OR branch requires a new index probe and intermediate row identifier (RID) or workfile storage in a multi-index access plan to union the results of each OR branch.

SUMMARY

Embodiments disclosed herein provide a system, method, and computer program product to modify a received query, the received query including a first predicate specifying a comparison operator and a second predicate specifying an IS NULL operator, by replacing the comparison operator of the first predicate with an extended comparison operator, and removing the IS NULL operator from the received query, the extended comparison operator configured to support searching of NULL values in a database management system (DBMS), wherein the extended comparison operator is configured to return rows having column data matching a value predefined to represent NULL values.

DETAILED DESCRIPTION

Embodiments disclosed herein provide extended (also referred to herein as augmented) comparison operators (including, but not limited to <, >, =, ≤, ≥, and IN) that support the search of known values and unknown NULL values in databases. In order to utilize these extended comparison operators, embodiments disclosed herein rewrite disjunctive (non-Boolean) predicates, such as "COL>2 OR COL IS NULL", to a comparison predicate such as "COL>*2", where >* denotes the augmented, NULL-tolerant comparison operator. Such a rewrite allows the predicate to avoid relational database limitations associated with disjunctive conditions, and allow the predicate to qualify for optimizations that are available to Boolean term comparisons, such as single matching index access, pushdown of predicates to materialized views and table expressions, distribution of predicates to other disjuncts, and predicate transitive closure (duplicating the predicate to be applied to another table based upon equivalency of an equi-join predicate). Additionally, converting the predicate to a single Boolean term condition allows a rewrite to disjunctive normal form to avoid the overhead associated with increasing the number of OR branches, since one Boolean predicate is distributed instead of two predicates separated by OR.

While the external representation of NULL tolerance requires the IS NULL predicate that represents "unknown" internally, some relational database management systems (DBMS) store the NULL as an internal format that is comparable to a known value. In these DBMS implementations, the internal representation of NULL may be either the smallest or largest value in the value space of the datatype. Examples used herein are based on an implementation where the largest value is used to represent NULL, however, embodiments of the disclosure can be equally applied to implementations where the smallest value is used to represent NULL. Regardless of the implementation used, the augmented operator returns the corresponding NULL values, which would have not been returned without augmenting the existing operators.

To illustrate, an application may store an open-ended insurance policy as having an end date of NULL, since the end date is yet unknown. Traditionally, a search for current policies may require the predicates "WHERE POLICY_END_DATE>CURRENT DATE OR POLICY_END_DATE IS NULL". By defining, in the DBMS, an augmented, NULL-tolerant greater than operator, >*, embodiments of the disclosure may rewrite the query as "WHERE POLICY_END_DATE>*CURRENT DATE", allowing the DBMS to return policies having known end dates occurring after the current date, as well as those policies having unknown (i.e., NULL) end dates. In this example, >* is used to denote "greater than including NULL." The NULL values will be returned as the extended operator returns the value corresponding to NULL, i.e., the largest value in the value space for POLICY_END_DATE. Although the example uses an augmented >, other extended comparison operators may be used, such as ≥* and =* (as well as less-than counterparts when NULL is represented by the smallest value, as described above). Additionally, BETWEEN or LIKE operators may potentially encapsulate a NULL value, however, the more common use cases are applied to <, >, ≥, ≤, =, and IN operators.

Relational databases, such as DB2® by the International Business Machines Corporation, store an additional 1 byte indicator preceding column data to represent NULL when a column is defined as NULLable, or can support NULL values. The NULL indicator byte is stored as hex x'FF' when the column is NULL, and hex x'00' when not NULL. When the NULL indicator is x'FF', the actual data stored in the column is irrelevant (although NULL is x'00' in both ASCII/EBCDIC). What this means is that NULLs are always stored last, after all non-NULL data, given an ascending sequence.

Therefore, internally to the relational database, if a column COL is defined as CHAR(1) and is NULLable, then COL IS NULL has an internal representation of COL=x'FF00', whereas a non-NULL value, such as COL='A' is stored as COL=x'0041'–x'00' is the NULL byte, and x'41' is ASCII for 'A.' In some DBMS implementations, the internal representation of the data portion is irrelevant when the NULL byte is set to x'FF'. The DBMS will only check the NULL byte when looking for x'FF' and will not check the data portion. Therefore, in some embodiments disclosed herein, it is assumed that the data portion is x'00' when NULL. Since the augmented operator would ignore the data portion when processing a NULL entry, this is referenced here for completeness.

Given the internal representation of NULL can appear as an equals predicate, embodiments disclosed herein provide numerous "disjunctive to conjunctive" rewrites are possible. For example, if the query specifies:
WHERE (POLICY_END_DATE>CURRENT DATE OR POLICY_END_DATE IS NULL) AND (STATUS='Y' OR GENDER='F')
The query may be rewritten in its NULL-tolerant form as:
WHERE POLICY_END_DATE>*CURRENT DATE AND (STATUS='Y' OR GENDER='F')
The NULL-tolerant predicate may then be distributed to each OR branch (in disjunctive normal form) without causing an increase in the number of OR branches, and therefore also avoiding an increase in the number of index probes when the query is further rewritten as:
WHERE (POLICY_END_DATE>*CURRENT DATE AND STATUS='Y') OR (POLICY_END_DATE>*CURRENT DATE AND GENDER='F')

As another example, "WHERE COL='A' OR COL IS NULL" can be rewritten as "WHERE COL IN* ('A', x'FF00'), where IN* denotes an augmented NULL-tolerant IN operator. Additionally, the query "WHERE COL IN ('A', 'B') OR COL IS NULL) can be rewritten as "WHERE COL IN* ('A', 'B', x'FF00'). Due to limitations with IN-list predicates in some databases, the transformation to a NULL-tolerant IN-list allows the database to exploit the augmented predicate for query optimizations related to IN-list predicates.

Embodiments disclosed herein advantageously support the ability to treat COL IS NULL as an equal predicate without the requirement to support the "=NULL" supported by some databases, or require users to rewrite SQL that is currently written as "IS NULL." Furthermore, embodiments of the disclosure augment the IN operator to also support NULL and known values so that disjunctive predicates may be rewritten into a conjunctive (Boolean) IN list predicate that is augmented to be NULL-tolerant, which may be used without rewriting existing SQL or requiring support for NULL-tolerant IN predicates.

Figure 1:
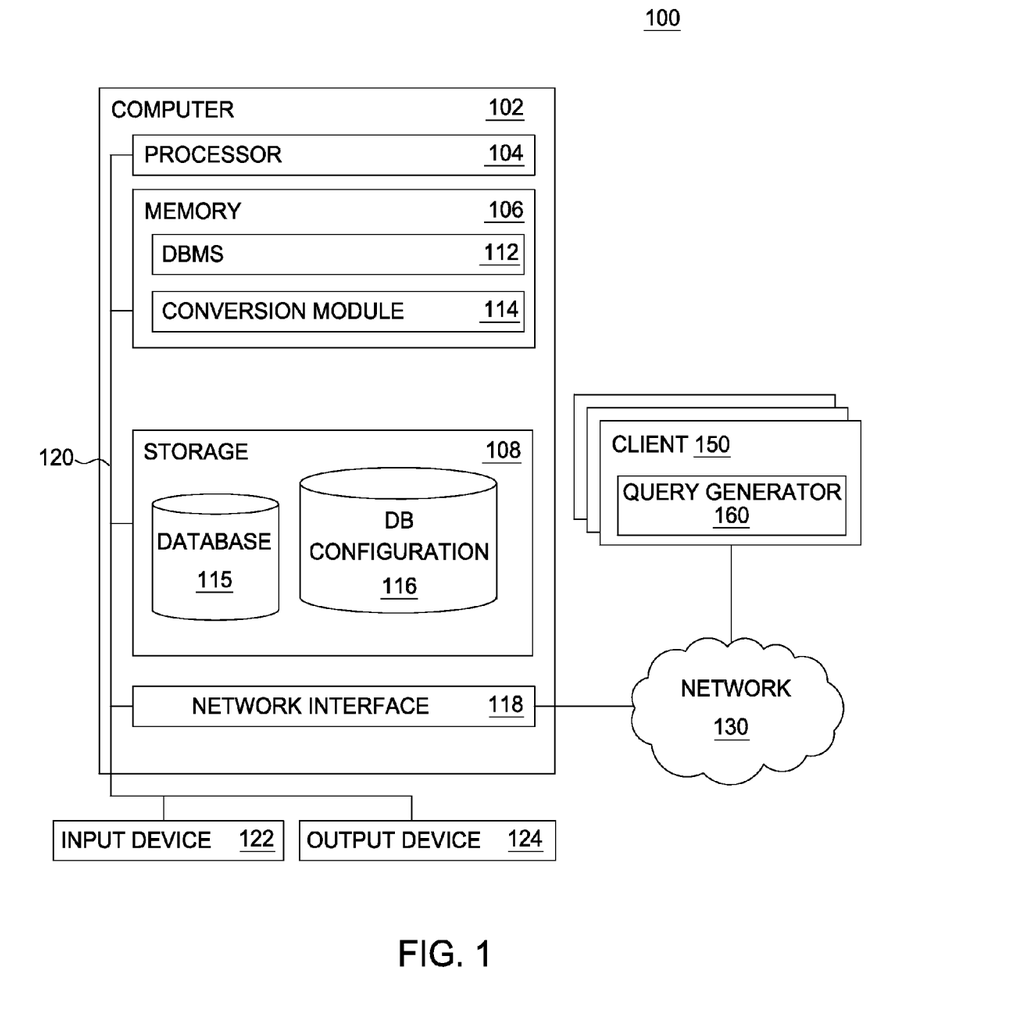
FIG. 1 illustrates a system for Boolean term conversion for NULL-tolerant disjunctive predicates, according to one embodiment disclosed herein.

FIG. 1 illustrates a system 100 for Boolean term conversion for NULL-tolerant disjunctive predicates, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains a database management system (DBMS) 112, which is a software system generally configured to allow the definition, creation, querying, update, and administration of databases, such as the database 115. The DBMS 112 also allows a DBMS administrator to define extended comparison operators that are NULL-tolerant, i.e., support the search and return of both known values and unknown NULL values. In order to provide the extended operators, a predefined value may be specified to represent NULL values. Examples include the largest possible value in the value space of a database column, or the smallest possible value in the value space of the column. If the predefined value is the largest value, an extended greater than operator may be provided. If the predefined value is the smallest value, an extended less than operators may be provided. In either implementation, extended equals (=) and extended IN operators may be provided.

The predefined value and extended operators may be stored in the DB config 116. For example, if the predefined value represents NULL values as the largest possible value in the value space, an extended greater than operator may allow the predicate "WHERE COLUMNDATA>1 OR COLUMNDATA IS NULL" to return rows where the COLUMNDATA value is greater than one, or is NULL. The memory 106 also contains a conversion module 114, which is an application generally configured to rewrite disjunctive query predicates including IS NULL statements as comparison predicates using augmented comparison operators provided by the DMBS 112. For example, the conversion module 114 may rewrite the predicate "WHERE COLUMNDATA>1 OR COLUMNDATA IS NULL" to "WHERE COLUMNDATA>*1" where >* represents the augmented greater than operator. In one embodiment, the conversion module 114 is a component of the DBMS 112. More specifically, in one embodiment, the conversion module 114 is a query optimizer of the DBMS 112.

As shown, storage 108 contains a database 115, which stores data records according to a predefined schema. The storage 108 also includes a DB configuration 116, which is generally configured to store configuration information for the DBMS 112, which may include, but is not limited to, comparison operators, extended (or augmented) operators, and predefined values representing NULL values in the database 115. As shown, a plurality of client computers $150_{1-N}$ may access the database 115 using a query generator 160 to issue queries to the DBMS 112.

Figure 2:
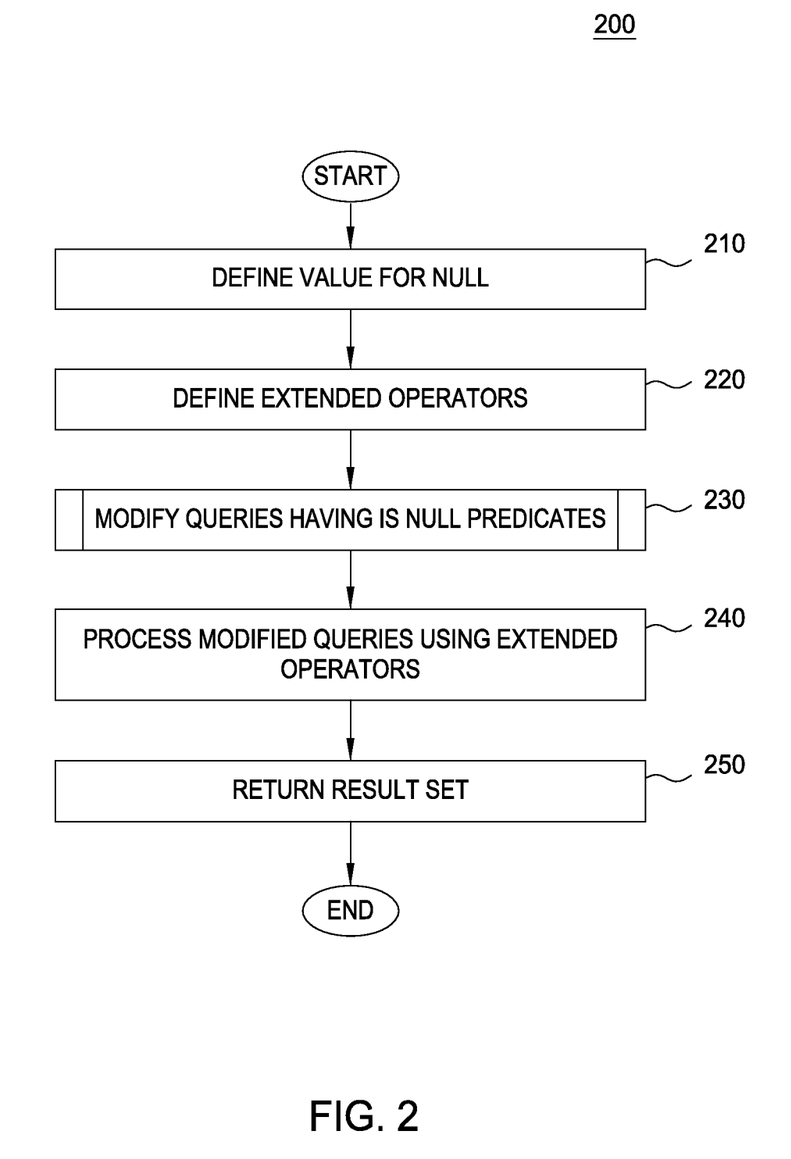
FIG. 2 illustrates a method for Boolean term conversion for NULL-tolerant disjunctive predicates, according to one embodiment disclosed herein.

FIG. 2 illustrates a method 200 for Boolean term conversion for NULL-tolerant disjunctive predicates, according to one embodiment disclosed herein. Generally, the method 200 provides extended, NULL-tolerant comparison operators, and modifies queries to use these extended operators in order to improve performance when executing the queries. In one embodiment, the DBMS 112 and conversion module 114 perform the steps of the method 200.

At step 210, a value to represent NULLs is defined. The value may be defined by an administrator, or predefined in the DBMS 112 or conversion module 114. For example, the value may be the largest or smallest possible value in the value space of a given column. Once the value to represent NULLs has been defined, extended, NULL-tolerant operators may be defined at step 220. Regardless of the value used to represent NULLs, extended equals and IN operators may be defined. If the value is the largest possible value in the value space of a column, extended greater than and extended greater-than-or-equal operators may be defined. If the value is the smallest possible value in the value space of a column, extended less than and extended less-than-or-equal operators may be defined.

At step 230, described in greater detail with reference to FIG. 3, the conversion module 114 modifies received queries having IS NULL predicates. The queries may be rewritten to support the search of known and NULL values in the database 115 by expressing a disjunctive predicate as a comparison predicate using the extended comparison operators. For example, "WHERE AGE >30 OR IS NULL" may be rewritten as "WHERE AGE >*30". At step 240, the DBMS may process the modified queries using the extended operators. At step 250, the DBMS may return the result set obtained by processing the modified query using the extended operators. Advantageously, the queries may be rewritten to use the extended operators without requiring user input specifying to do so.

Figure 3:
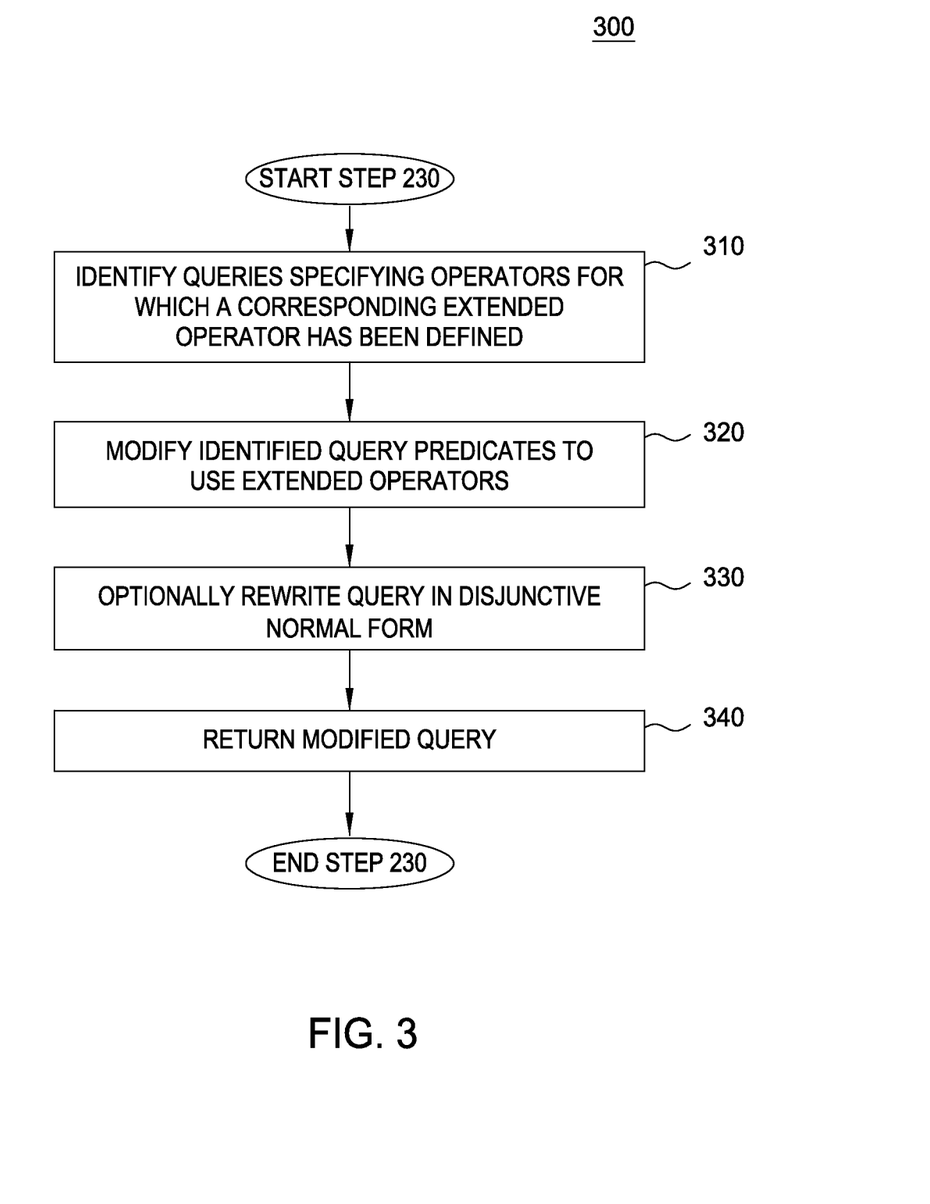
FIG. 3 illustrates a method to modify a query, according to one embodiment disclosed herein.

FIG. 3 illustrates a method 300 corresponding to step 230 to modify a query, according to one embodiment disclosed herein. Generally, the steps of the method 300 rewrite disjunctive (non-Boolean term) predicates in queries as Boolean term comparison predicates using the extended comparison operators described herein. In one embodiment, the conversion module 114 performs the steps of the method 300.

At step 310, the conversion module 114 identifies queries specifying operators for which a corresponding extended operator has been defined. For example, if a query specifies a "<" operator, but the predefined value for NULLs is the largest possible value in the value space, an extended "<*" cannot be used. In such a scenario, an "<*" operator has not been defined, as only an extended ">*" may return the NULL values residing in the largest possible value of the value space. However, if the query specifies "WHERE (POLICY_END_DATE>CURRENT DATE OR POLICY_END_DATE IS NULL) AND (STATUS='Y' OR GENDER='F'), and the >* operator has been defined, the predicates can be rewritten using the extended greater than operator. At step 320, the conversion module 114 may modify the identified query predicates to use the extended operators provided by the DBMS 112. For example, the query above may be rewritten in its NULL-tolerant form as:
WHERE POLICY_END_DATE>*CURRENT DATE AND (STATUS='Y' OR GENDER='F')

At step 330, the conversion module 114 may rewrite the query in disjunctive normal form by distributing the NULL-tolerant predicate to each OR branch, if necessary. For example, the above NULL-tolerant query may be rewritten as: WHERE (POLICY_END_DATE>*CURRENT DATE AND STATUS='Y') OR (POLICY_END_DATE>*CURRENT DATE AND GENDER='F').

As another example, "WHERE COL='A' OR COL IS NULL" can be rewritten as "WHERE COL IN* ('A', x'FF00')", where IN* denotes an extended NULL-tolerant IN operator. Additionally, the query "WHERE COL IN ('A', 'B') OR COL IS NULL) can be rewritten as "WHERE COL IN* ('A', 'B', x'FF00'). Advantageously, rewriting the queries in this manner allows the use of the extended operators without causing an increase in the number of OR branches, and therefore also avoiding an increase in the number of index probes. At step 340, the conversion module 114 returns the modified query.

Although a query such as WHERE POLICY_END_DATE <CURRENT DATE OR POLICY_END_DATE IS NULL cannot use the single extended operator when NULLs are stored as the highest value—a similar approach to that of the equals or IN can be used for non-consecutive ranges. The above example could be logically rewritten as WHERE POLICY_END_DATE IN* (<CURRENT DATE, x'FF00')—where IN* indicates NULL tolerance (as does x'FF00), and "<CURRENT DATE" indicates that the first leg of the IN condition is a "<" predicate. While this extension does not reduce the number of index probes (since IN requires 1 probe per IN-list element), it does allow exploitation of other benefits associated with Boolean term predicates. This approach also applies to other range conditions such as BETWEEN.

Advantageously, embodiments disclosed herein provide extended operators that support the search and return of known and unknown (NULL) values in a database. For example, an extended less than operator may return values "less than x including NULL", where x is some known value. Embodiments disclosed herein rewrite received queries to include the NULL-tolerant predicates and express disjunctive predicates in disjunctive normal form. By doing so, embodiments disclosed herein provide increased performance in a DBMS by reducing the number of OR branches in a query that require an index probe.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access database applications or related data available in the cloud. For example, the conversion application could execute on a computing system in the cloud, define extended operators in a DBMS, and rewrite queries to use the extended operators. In such a case, the conversion application could create extended operators and store the extended operators at a storage location in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
one or more computer processors; and
a memory containing a program, which when executed by the one or more computer processors, performs an operation comprising:
determining that a received query comprises a first predicate specifying a comparison operator and a second predicate specifying an IS NULL operator;
modifying the received query, wherein modifying the received query comprises:
replacing the comparison operator of the first predicate with an extended comparison operator, wherein the extended comparison operator is not a NULL operator and returns column values having a value predefined to represent NULL values; and
removing the second predicate and the IS NULL operator from the received query; and
processing the modified query, wherein processing the modified query comprises:
searching a set of column values in a database management system (DBMS) satisfying the extended comparison operator of the first predicate; and
returning at least a first column value, of the set of column values, as responsive to the modified query, wherein the first column value satisfies the extended comparison operator of the first predicate by matching the value predefined to represent NULL values.

2. The system of claim 1, wherein the modified query comprises a single comparison predicate, wherein the single comparison predicate comprises the extended comparison operator, wherein the value predefined to represent NULL values comprises one of: (i) a largest value capable of being stored in the column data, and (ii) a smallest value capable of being stored in the column data, the operation further comprising:
providing the extended comparison operator in the DBMS.

3. The system of claim 2, the operation further comprising:
prior to modifying the received query, determining whether a NULL indicator of at least one row of column data specified in the received query indicates whether the column data is NULL, wherein the NULL indicator precedes the column data.

4. The system of claim 3, wherein the received query is modified upon determining that the value predefined to represent NULL values would be returned by applying the extended comparison operator to the column data, the operation further comprising:
executing the modified query.

5. The system of claim 4, wherein the value predefined to represent NULL values is the largest value capable of being stored in the column data, wherein searching the set of column values comprises identifying column values matching at least one of: (i) the value predefined to represent NULL values, (ii) a value between a specified value in the first predicate and the value predefined to represent NULL values, and (iii) the specified value in the first predicate, wherein the extended comparison operator comprises each individual extended operator selected from the group comprising: (i) an extended greater than operator, (ii) an extended equals operator, and (iii) an extended greater than or equals operator.

6. The system of claim 4, wherein the value predefined to represent NULL values is the smallest value capable of being stored in the column data, wherein searching the set of column values comprises identifying column values matching at least one of: (i) the value predefined to represent NULL values, (ii) a value between the value predefined to represent NULL values and a specified value in the first predicate, and (iii) the specified value in the first predicate, wherein the extended comparison operator comprises each individual extended operator selected from the group comprising: (i) an extended less than operator, (ii) an extended equals operator, and (iii) an extended less than or equals operator.

7. The system of claim 6, wherein the extended comparison operator comprises an IN list predicate that is augmented to be NULL-tolerant.

8. The system of claim 1, wherein searching the set of column values comprises identifying column values matching the value predefined to represent NULL values.

9. A computer program product, comprising:
a non-transitory computer-readable storage medium having computer-readable program code embodied therewith, the computer-readable program code executable by a processor to perform an operation comprising:
determining that a received query comprises a first predicate specifying a comparison operator and a second predicate specifying an IS NULL operator;
modifying the received query, wherein modifying the received query comprises:
replacing the comparison operator of the first predicate with an extended comparison operator, wherein the extended comparison operator is not a NULL operator and returns column values having a value predefined to represent NULL values; and
removing the second predicate and the IS NULL operator from the received query; and
processing the modified query, wherein processing the modified query comprises:
searching a set of column values in a database management system (DBMS) satisfying the extended comparison operator of the first predicate; and
returning at least a first column value, of the set of column values, as responsive to the modified query, wherein the first column value satisfies the extended comparison operator of the first predicate by matching the value predefined to represent NULL values.

10. The computer program product of claim 9, wherein the modified query comprises a single comparison predicate, wherein the single comparison predicate comprises the extended comparison operator, wherein the value predefined to represent NULL values comprises one of: (i) a largest value capable of being stored in the column data, and (ii) a smallest value capable of being stored in the column data, the operation further comprising:

provilding the extended comparison operator in the DBMS.

11. The computer program product of claim 10, the operation further comprising:

prior to modifying the received query, determining whether a NULL indicator of at least one row of column data specified in the received query indicates whether the column data is NULL, wherein the NULL indicator precedes the column data.

12. The computer program product of claim 11, wherein the received query is modified upon determining that the value predefined to represent NULL values would be returned by applying the extended comparison operator to the column data, the operation further comprising:

executing the modified query.

13. The computer program product of claim 12, wherein the value predefined to represent NULL values is the largest value capable of being stored in the column data, wherein searching the set of column values comprises identifying column values matching at least one of: (i) the value predefined to represent NULL values, (ii) a value between a specified value in the first predicate and the value predefined to represent NULL values, and (iii) the specified value in the first predicate, wherein the extended comparison operator comprises each individual extended operator selected from the group comprising: (i) an extended greater than operator, (ii) an extended equals operator, and (iii) an extended greater than or equals operator.

14. The computer program product of claim 12, wherein the value predefined to represent NULL values is the smallest value capable of being stored in the column data, wherein searching the set of column values comprises identifying column values matching at least one of: (i) the value predefined to represent NULL values, (ii) a value between the value predefined to represent NULL values and a specified value in the first predicate, and (iii) the specified value in the first predicate, wherein the extended comparison operator comprises each individual extended operator selected from the group comprising: (i) an extended less than operator, (ii) an extended equals operator, and (iii) an extended less than or equals operator.

15. The computer program product of claim 9, wherein searching the set of column values comprises identifying column values matching the value predefined to represent NULL values.

* * * * *